United States Patent [19]

Igarashi et al.

[11] Patent Number: 5,036,124
[45] Date of Patent: Jul. 30, 1991

[54] POLYVINYL CHLORIDE RESIN COMPOSITION FOR POWDER MOLDING

[75] Inventors: Toshio Igarashi, Kyoto; Akira Wakatsuki, Ibaraki; Kenichi Sudo; Yuu Shida, both of Takatsuki, all of Japan

[73] Assignee: Sumitomo Chemical Company, Limited, Osaka, Japan

[21] Appl. No.: 563,566

[22] Filed: Aug. 6, 1990

Related U.S. Application Data

[63] Continuation-in-part of Ser. No. 385,412, Jul. 26, 1989, abandoned.

[30] Foreign Application Priority Data

Aug. 3, 1988 [JP] Japan .................................. 63-194783

[51] Int. Cl.$^5$ ................................ C08K 5/09
[52] U.S. Cl. .................................. 524/298; 524/569
[58] Field of Search .......................... 524/298, 569

[56] References Cited

U.S. PATENT DOCUMENTS

| | | | |
|---|---|---|---|
| 3,872,154 | 3/1975 | Hirzy | 524/298 |
| 4,241,192 | 12/1980 | Goswami | 521/94 |
| 4,272,464 | 6/1981 | Asai et al. | 524/507 |
| 4,659,764 | 4/1987 | Isao et al. | 524/399 |

Primary Examiner—Joseph L. Schofer
Assistant Examiner—Mark Sweet
Attorney, Agent, or Firm—Wenderoth, Lind & Ponack

[57] ABSTRACT

A polyvinyl chloride resin composition for powder molding, containing a dry blend of a polyvinyl chloride resin and a plasticizer, wherein the plasticizer is a mixed trimellitate of a mixture of compounds of the formula

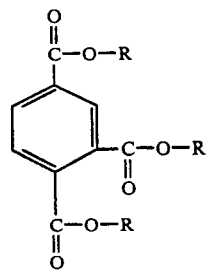

where R is an alkyl group, each of the compounds contains the same or different alkyl group in the same or different molecules, and the alkyl groups in the mixture have a straight chain ratio of at least 85 mol % and consist of 5 to 55 mol % of alkyl groups having at most seven carbon atoms, 45 to 95 mol % of alkyl groups having eight carbon atoms, and at most 10 mol % of alkyl groups having at least nine carbon atoms.

1 Claim, No Drawings

POLYVINYL CHLORIDE RESIN COMPOSITION FOR POWDER MOLDING

This is a continuation-in-part of Ser. No. 07/385,412 filed July 26, 1989 now abandoned.

The present invention relates to a polyvinyl chloride resin composition for powder molding.

More specifically, the present invention relates to a powdery resin composition for rotational or slush powder molding which is particularly useful for producing covering materials for interior parts of automobiles, such as crash pads, arm rests, head rests, console boxes, meter covers and door trims.

In recent years, there has been an increasing demand for covering materials which are light in weight, are very soft to the feel, and have embossed or stitched patterns giving a high grade feeling, when they are used for interior parts of automobiles.

There have hitherto been available a soft vacuum-formed sheet material composed mainly of a polyvinyl chloride resin and an ABS resin, and a rotational- or slush-molded product of a sol composed mainly of a paste polyvinyl chloride resin and a plasticizer (hereinafter referred to as the "sol-molded product").

The vacuum-formed material is, however, not satisfactorily soft to the feel, though it is light in weight. It is still possible to obtain only a material having a hard touch. Moreover, it is difficult to produce a vacuum-formed material having a complex surface configuration defined by embossed or stitched patterns giving a high grade feeling.

Another drawback of any such vacuum-formed material resides in the presence of a large amount of residual strain which makes it likely to crack if it is used for a long time.

On the other hand, the sol-molded product is soft to the feel. The sol from which it is molded, however, has so low a gelation temperature that its melting in a mold occurs easily and causes phenomena, such as the formation of flow marks or lips, and the stringing of the sol.

Therefore, it has a number of drawbacks. For example, it has a rear surface lacking smoothness, it takes an unduly long time to remove the sol from the mold, and it provides a covering material having an undesirably large thickness.

Other problems that arise from the use of a sol include a great deal of labor which is required for cleaning a tank, pipeline, etc. when a material having a different color is going to be manufactured, and a change of viscosity which does not permit its storage for a long time.

Powder molding has recently been attracting attention as a process which can overcome the drawbacks and problems as hereinabove pointed out.

Several processes are generally known as powder molding. They include fluidized bed coating, electrostatic coating, flame spray coating, and rotational or slush molding. Rotational or slush molding is, among others, suitable for producing covering materials for the interior of automobiles.

Rotational or slush molding is a process in which a mold kept at a temperature of 180° C. or above and a powder supply box are rotated or shaken together, or a powder is injected into the mold, so that the powder may be melted and adhere to the inner surface of the mold, while the powder not adhering to it is automatically or forcedly recovered into the box (Japanese Patent Kokai No. 132507/ 83).

The mold which is used for powder molding is heated by, for example, employing a gas-fired furnace, circulating oil as a heat medium, dipping in oil or hot fluidized sand, or using a high frequency induction heating system (Sumitomo Chemical Journal, 1985-I, pages 84 to 91).

It is well known that a polyvinyl chloride resin is blended with a plasticizer, stabilizer, pigment, etc. in a dry state by a blender or high-speed rotary mixer equipped with a heating jacket to prepare a powder composition.

The powder resin composition which is used for powder molding need be of high flowability and moldability. A powder resin composition of still improved flowability and moldability has come to be required for making crash pads, meter hoods or other parts having larger sizes and more complex shapes that are required for larger automobiles or automobiles of higher grade.

It is also well known that a fine powder of a polyvinyl chloride resin and a finely divided inorganic filler, such as calcium carbonate or silica, are added to a dry blended powder composition during its cooling in order to improve its flowability and moldability (Rubber Digest, Vol. 14, No. 8, pp. 32–40; Polyvinyl Chloride—Its Chemistry and Industry—II, pp. 367–370, 1968; and Japanese Patent Publication No. 1575/62). This method, however, cannot necessarily be said to be capable of preparing a powder composition which can make a molded product having as high quality as is desired.

The recent demand for an automobile of higher grade and a different design, and having lower air resistance has resulted in the use of a larger windshield which is nearly parallel to a crash pad and a meter hood. This arrangement brings about an increase in surface temperature of the crash pad and the meter hood and requires them to be of higher heat resistance. An automobile undesirably has a lower commercial value if a falling object or another source of a shock cracks or otherwise damages the surface of the covering material for any of its interior parts, such as a crash pad or meter hood, when it is used in cold weather. Therefore, low temperature resistance is also required of the covering material for any such part which has been molded from a powder resin composition.

A mixed trimellitate type plasticizer has come to be preferred for use as a plasticizer for a powder resin composition in order to produce any such covering material of improved heat resistance, since this type of plasticizer does not undergo substantial evaporation when heated at a high temperature, or any substantial migration to a backing layer of a urethane foam.

A mixed trimellitate type plasticizer is, however, generally low in absorptivity by particles of a polyvinyl chloride resin. A powder resin composition prepared by employing this type of plasticizer has, therefore, a higher plasticizer concentration on the surfaces of particles of a polyvinyl chloride resin and the surfaces of the particles grow sticky. Therefore, the addition of a fine powder of a polyvinyl chloride resin or an inorganic filler to a dry blended composition during its cooling does not satisfactorily improve its flowability or moldability.

It is also necessary to consider the possibility of improving the low temperature resistance of any such interior part of an automobile, since the interior parts molded from a powder composition containing a mixed trimellitate type plasticizer are generally poor in low temperature resistance.

Under these circumstances, we, the inventors of this invention, have devoted ourselves to a study for obtaining a mixed trimellitate plasticizer which can be used effectively for preparing a powder resin composition of improved flowability and moldability and thereby manufacturing a molded product of improved heat and low temperature resistances. As a result, we have found that the use of a mixed trimellitate plasticizer containing an alkyl group having a large chain length results in a powder composition of low flowability and moldability, though it enables the manufacture of a molded product having good heat resistance, while the reverse is true if a mixed trimellitate plasticizer containing an alkyl group having a small chain length is used, that is, the use of a mixed trimellitate plasticizer containing an alkyl group having a low straight chain ratio results in a powder composition of good flowability and moldability, but a molded product of poor low-temperature resistance. We have also found that the use of a mixed trimellitate plasticizer containing an alkyl group having a specific range of a chain length distribution and a straight chain ratio of at least 85 mol %, or preferably at least 90 mol %, makes it possible to prepare a powder resin composition of good flowability and moldability and manufacture a molded product of good heat and low-temperature resistances. This discovery forms the basis of our invention.

According to this invention, therefore, there is provided a polyvinyl chloride resin composition for powder molding obtained by the dry blending of a polyvinyl chloride resin, a plasticizer, a stabilizer, and any other necessary additive, such as a pigment, a filler, a foaming agent and an auxiliary additive, characterized in that the plasticizer is a mixed trimellitate plasticizer comprising a mixture of compounds represented by general formula I:

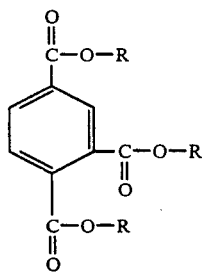

where R stands for an alkyl group, each of the compounds contains the same or different alkyl groups in one and the same molecule, or different molecules, and the alkyl groups in the mixture have a straight chain ratio of at least 85 mol % and consist of 5 to 55 mol % of alkyl groups having at most seven carbon atoms, 45 to 95 mol % of alkyl groups having eight carbon atoms, and at most 10 mol % of alkyl groups having nine and ten carbon atoms, and substantially no alkyl groups having at least eleven carbon atoms.

Explanation will now be made in further detail of the chain length distribution of the alkyl groups in the mixed trimellitate plasticizer as represented by formula I above.

The preferred alkyl groups having at most seven carbon atoms are ones having six or seven carbon atoms. The plasticizer contains 5 to 55 mol %, or preferably 10 to 45 mol %, of such alkyl groups. The use of any plasticizer containing less than 5 mol % of such alkyl groups is undesirable, as it yields a powder resin composition of low flowability and moldability. The use of any plasticizer containing more than 55 mol % of such alkyl groups is also undesirable, as it yields a composition which can make only a molded product of low heat resistance.

The plasticizer contains 45 to 95 mol %, or preferably 55 to 90 mol %, of alkyl groups having eight carbon atoms. The use of any plasticizer containing less than 45 mol % of such alkyl groups is undesirable, as it yields a powder resin composition which can make only a molded product of low heat resistance. The use of any plasticizer containing more than 95 mol % of such groups is also undesirable, as it yields a composition of low flowability and moldability.

The proportion of alkyl groups having nine and ten carbon atoms had better be as small as possible. It should not exceed 10 mol %, or preferably should not exceed 6 mol %. The use of any plasticizer containing more than 10 mol % of such alkyl groups is undesirable, as it yields a powder resin composition of low flowability and moldability.

The mixed trimellitate plasticizer should be substantially free from alkyl groups having eleven or more carbon atoms. If the content of alkyl groups having eleven or more carbon atoms is 1 mol % or more, the resulting powder coating resin composition would be low in flowability and moldability.

The alkyl groups have a straight chain ratio of at least 85 mol %, or preferably at least 90 mol %. The use of any plasticizer of the structure in which the alkyl groups have a straight chain ratio lower than 85 mol % is undesirable, as it results in a molded product of poor low-temperature resistance. The straight chain ratio means the proportion of straight-chain alkyl groups, such as n-octyl, n-heptyl and n-hexyl, in all of the alkyl groups that the plasticizer contains. Incidentally, isooctyl, isoheptyl, isohexyl and 2-ethyl-hexyl are examples of the branched alkyl groups.

Although there is no particular limitation to the proportion of the mixed trimellitate plasticizer which is employed for the purpose of this invention, it is possible to use, for example, 30 to 90 parts by weight of the plasticizer for 100 parts by weight of a polyvinyl chloride resin. The use of less than 30 parts by weight of the plasticizer for 100 parts by weight of the resin is undesirable, as it results in a molded product which is low in heat and low-temperature resistances. The use of more than 90 parts by weight is also undesirable, as it yields a powder resin composition of low flowability and moldability.

It is possible to use with a mixed trimellitate plasticizer another type of plasticizer, particularly a phthalic acid ester type plasticizer, such as diisodecyl phthalate, diisoundecyl phthalate, or dialkyl phthalate containing alkyl groups having 9 to 11 carbon atoms, if it does not have any adverse effect on the object of this invention.

The polyvinyl chloride resin which is employed for the purpose of this invention is produced by suspension, mass or emulsion polymerization. More specifically, it is possible to use, for example, a vinyl chloride polymer, a copolymer of vinyl chloride with ethylene, propylene, vinyl acetate, or alkyl acrylate or methacrylate, a graft copolymer obtained by grafting vinyl chloride to a copolymer of ethylene and vinyl acetate, or a mixture of two or more such polymers.

The polyvinyl chloride resin composition of this invention may contain a stabilizer. It is possible to use as the stabilizer a compound of a metal such as zinc, barium, sodium, potassium, calcium, lithium or tin, for example, a carboxylic acid salt of any such metal. A Ba/Zn salt is, among others, preferred.

It is also possible to add to any such stabilizer a stabilizer selected from among, for example, magnesium oxide, magnesium hydroxide, a hydrotalcite compound, zinc oxide, barium oxide, calcium oxide and barium phosphate. It is also possible to use a phenol or thioether type antioxidant, an ultraviolet absorber selected from among, e.g. hindered amines, phosphites, diketo compounds, salicylic acid esters, benzophenone and benzotriazole, epoxidized soybean oil, and an epoxy compound obtained by synthesizing bisphenol A and epichlorohydrin. It is particularly effective to use a hydrotalcite compound with a Ba/Zn salt, as this combination imparts improved heat resistance to a molded product when it is laminated with a urethane foam.

The polyvinyl chloride resin powder composition of this invention may contain a pigment, a filler, a foaming agent and various kinds of auxiliary additives, if required, in addition to the plasticizer and the stabilizer.

The wording "100 parts by weight of a polyvinyl chloride resin" as employed for describing the invention refers to the total weight of the resin employed for dry blending and the resin added after dry blending.

EXAMPLES

1. Mixed trimellitate plasticizers:

TABLE 1 shows the mixed trimellitate plasticizers which were employed in Examples of this invention and Comparative Examples.

The distribution of the alkyl groups in each of plasticizers A to I was determined by programed-temperature gas chromatography.

These mixed trimellitate plasticizers may be prepared by reacting trimellitic anhydride with a mixture of alcohols having a composition corresponding to the alkyl groups, their mol % and straight chain ratio desired in the resulting trimellitate mixture, the reaction proceeding substantially stoichiometrically.

More specifically the particular mixed trimellitate plasticizers indicated in the above TABLE 1 were prepared as follows:

Plasticizer A

To a reaction vessel (50 liters volume) equipped with a stirrer and a jacket for circulation of pressurized steam there were charged 9600 g (50 mol) of trimellitic anhydride, 1275 g (12.5 mol) of n-hexyl alcohol, 4930 g (42.5 mol) of n-heptyl alcohol, 11700 g (90 mol) of n-octyl alcohol, 1080 g (7.5 mol) of n-nonyl alcohol, 95 g (0.5% based on total alcohols) of p-toluene sulfonic acid and 3000 g of benzene (as water entrainer). The mixture was reacted at 120° C. for 8 hours. Then the reaction product was added with 1000 g of 4% aqueous solution of sodium hydroxide for the neutralization and then washed three times with 15 liters of distilled water. Benzene was distilled off by distillation under atmospheric pressure and then the product was subjected to distillation under reduced pressure to obtain 16.4 kg (yield 58%) of a mixed trimellitate having a composition corresponding to the Plasticizer A shown in TABLE 1.

Plasticizers B to I

The same procedures were repeated except that the kinds and amounts of alcohols were varied to obtain the Plasticizers B to I indicated in TABLE 1.

TABLE 1

| Alkyl group | Mixed trimellitate plasticizers Plasticizer (mol %) | | | | | | | | |
|---|---|---|---|---|---|---|---|---|---|
| | A | B | C | D | E | F | G | H | I |
| n-hexyl | 8 | 6 | <1 | <1 | 5 | 28 | 21 | 18 | 8 |
| Isoheptyl | <1 | <1 | <1 | 15 | <1 | <1 | <1 | <1 | <1 |
| n-heptyl | 27 | 24 | <1 | 22 | 12 | 40 | <1 | <1 | 26 |
| Isooctyl | <1 | <1 | <1 | 12 | 8 | <1 | <1 | <1 | <1 |
| n-octyl | 61 | 40 | 99 | 33 | 73 | 32 | 77 | 62 | 58 |
| Isonoyl | <1 | <1 | <1 | 8 | <1 | <1 | 1 | 1 | <1 |
| n-nonyl | 4 | 21 | <1 | 10 | 2 | <1 | 1 | 1 | 3 |
| n-decyl | <1 | 9 | <1 | <1 | <1 | <1 | 2 | 20 | <1 |
| n-undecyl | <1 | <1 | <1 | <1 | <1 | <1 | <1 | <1 | 5 |
| Straight chain ratio (mol %) | 99< | 99< | 99< | 65 | 92 | 99< | 99< | 99< | 99< |

2. Items and methods of evaluation:

The resin composition of this invention was evaluated with respect to the following items:

(1) Powder flowability:

A sample of each powder resin composition in the amount of 100 ml was placed in the funnel of a bulk specific gravity measuring device conforming to the specifications of JIS-K-6721. The counting of time (seconds) was started when the sample began to drop upon removal of a damper, and was terminated when all of the sample finished dropping. The results of Examples 1 to 6 are shown in TABLE 2, and those of Comparative Examples 1 to 8 in TABLE 3. The shortness of the time is a measure of good flowability.

(2) Moldability:

A sample of each powder resin composition in the amount of 500 g was scattered on a 300 mm square embossed nickel plate used as a mold and heated to a temperature of 220° C. in an oven having an atmosphere temperature of 300° C., and was allowed to undergo fusion. After 10 seconds, the unfused powder was discharged from the oven and the embossed plate with the fused powder thereon was heated for 40 seconds in the oven having an atmosphere temperature of 300° C. After it had been cooled, a molded sheet was released from the mold. The molded sheets which had been obtained had an average thickness of about 1 mm. The moldability of each composition was judged from the weight of the sheet which had been molded from it. A sheet molded from a composition of low moldability had a heavy weight, since the unfused powder could not satisfactorily be discharged, but a considerably large amount thereof remained on the sheet.

Moreover, the rear surface of each molded sheet was examined for the evaluation of each composition for moldability in accordance with the following criteria:

o: All of the powder had been uniformly fused without leaving any unfused portion;

o−Δ: A portion remained unfused (not more than about 5%);

Δ: A considerable portion remained unfused (about 5 to 30%);

Δ−x: A large portion remained unfused (about 30 to 50%), giving a partly uneven surface;

x: A very large portion remained unfused (more than about 50%), giving a wholly uneven surface.

The results of Examples 1 to 6 are shown in TABLE 2, and those of Comparative Examples 1 to 8 in TABLE 3.

(3) Heat resistance:

Each of the molded sheets which had been obtained from the moldability tests as described at (2) above was placed with its embossed surface down in a 300 mm square aluminum supporting frame having a thickness of 10 mm and mounted on a foaming stand formed from an aluminum plate. A total of 153 g consisting of 100 parts by weight of a polyol mixture comprising a polyol composed mainly of a propylene and ethylene oxide adduct of glycerin, water, triethanolamine and triethylenediamine, and 50 parts by weight of polymeric MDI containing 30.5% of NCO was injected into the frame to produce a urethane foam bonded intimately to the rear surface of the molded sheet. The urethane laminated on the sheet had a thickness of 9 mm and a foam density of 0.16 g/cm$^3$. The urethane-laminated sheet was formed into specimens each measuring 70 mm by 150 mm. Three specimens were placed in a Geer oven having an atmosphere temperature of 110° C. so that they might be taken out every 400 hours, and were subjected to up to 1200 hours of thermal discoloration and deterioration tests.

The results of the thermal discoloration tests are shown by the grades of a gray scale. The results of the thermal deterioration tests are shown by the elongation (%) at rupture which was determined by a tensile testing machine in which a sample formed by a #1 dumbbell from the molded sheet separated from the specimen which had been taken out of the Geer oven upon expiration of a given length of time was pulled at a constant rate of 200 mm per minute at an ambient temperature of 23° C. The results of Examples 1 to 6 are shown in TABLE 2, and those of Comparative Examples 1 to 8 in TABLE 3.

(4) Low temperature resistance:

Each of the urethane-laminated sheets which had been prepared for the heat resistance tests as described at (3) above was cut into 100 mm square specimens. Each specimen was cooled to a temperature of −40° C. and was immediately subjected to a low-temperature impact test conducted by employing a Dupont impact tester and dropping a weight of 500 g from various levels of height. The maximum height from which the weight could be dropped without breaking any of three specimens of each sheet was adopted as a measure indicating its low temperature resistance. The results of Examples 1 to 6 are shown in TABLE 2, and those of Comparative Examples 1 to 8 in TABLE 3.

EXAMPLES 1 TO 6 AND COMPARATIVE EXAMPLES 1 TO 8

The invention will now be described with reference to the examples which are not intended for limiting the scope of this invention.

(1) Preparation of resin compositions for powder molding:

A supermixer having a capacity of 20 liters was charged with 1.8 kg of a polyvinyl chloride resin produced by an ordinary method of suspension polymerization and having an average polymerization degree of 800 [Sumilit (registered trademark) SX-8G; product of Sumitomo Chemical Co., Ltd.]. The mixer was rotated at a constant speed to stir the resin, and when the resin had reached a temperature of 80° C., the mixer was charged with a plasticizer, a stabilizer, a pigment and epoxidized soybean oil, so that dry blending might be started.

The plasticizer and the amount thereof which were employed in each of Examples 1 to 6 are shown in TABLE 2, while those employed in each of Comparative Examples 1 to 8 are shown in TABLE 3. The stabilizer was a mixture of 14 g of barium oxalate, 12 g of zinc oxalate, and 20 g of a perchlorate salt of hydrotalcite. The pigment was a gray pigment produced by Sumika Color Co., Ltd. and was employed in the amount of 80 g. The epoxidized soybean oil was a product of Adeka Argus known as 0-130P and was employed in the amount of 80 g. When the dry blended product had reached a temperature of 122° C., the supply of steam for heating was discontinued, and when dry blending had been completed, the supply of cooling water was started. When the dry blended product had been cooled to a temperature not exceeding 50° C., 200 g of fine particles of a paste polyvinyl chloride resin [Sumilit (registered trademark) PxQL product of Sumitomo Chemical Co., Ltd.]were uniformly Scattered on the dry blended product, whereby a powder resin composition was obtained.

Each of the powder resin compositions which had been obtained was evaluated for flowability, moldability, heat resistance and low-temperature resistance by the methods as hereinabove described. The results are shown in TABLES 2 and 3.

All of the compositions according to Examples 1 to 6 were good in flowability and moldability, and all of the molded products thereof were good in heat and low-temperature resistances.

The sheets molded from the compositions of Comparative Examples 1 and 6 were low in heat resistance. The compositions of Comparative Examples 2, 3, 4, 7 and 8 were all low in flowability and moldability. The sheet molded from the composition of Comparative Example 5 was poor in low-temperature resistance.

TABLE 2

| | (EXAMPLES) | | | | | |
| --- | --- | --- | --- | --- | --- | --- |
| | Examples | | | | | |
| Plasticizer | 1 | 2 | 3 | 4 | 5 | 6 |
| Mixed trimellitate plasticizer | A | A | A | A | E | G |
| Amount added (kg) | 1.0 | 1.3 | 1.5 | 0.8 | 1.3 | 1.3 |
| DL-911P (kg) | — | — | — | 0.4 | — | — |

TABLE 2-continued
(EXAMPLES)

| Plasticizer | Examples | | | | | |
|---|---|---|---|---|---|---|
| | 1 | 2 | 3 | 4 | 5 | 6 |
| [Phthalate plasticizer] Powder flowability (sec.) | 14 | 17 | 19 | 17 | 19 | 16 |
| Moldability | | | | | | |
| Sheet weight (g) | 92 | 94 | 98 | 96 | 96 | 94 |
| Rear surface condition | O | O | O~Δ | O | O | O |
| Heat resistance (h) | | | | | | |
| Thermal discoloration resistance 400 | Grade 3 | 3~4 | 4 | 3 | 4 | 3~4 |
| Thermal deterioration resistance (Elongation %) 0 | 270 | 280 | 290 | 280 | 280 | 280 |
| 400 | 250 | 270 | 280 | 260 | 260 | 270 |
| 800 | 200 | 230 | 260 | 210 | 220 | 220 |
| 1200 | 120 | 170 | 200 | 130 | 160 | 160 |
| Low temperature resistance (cm) | 70 | 90 | >100 | >100 | 70 | 80 |

TABLE 3
(COMPARATIVE EXAMPLES)

| Plasticizer | Comparative Examples | | | | | | | |
|---|---|---|---|---|---|---|---|---|
| | 1 | 2 | 3 | 4 | 5 | 6 | 7 | 8 |
| Mixed trimellitate plasticizer | A | A | B | C | D | F | H | I |
| Amount added (kg) | 0.4 | 2.0 | 1.3 | 1.3 | 1.3 | 1.3 | 1.3 | 1. |
| DL-911P (kg) [Phthalate plasticizer] | 0.8 | — | — | — | — | — | — | — |
| Powder flowability (sec.) | 18 | 24 | 29 | 22 | 18 | 16 | 30 | 26 |
| Moldability | | | | | | | | |
| Sheet weight (g) | 97 | 108 | 115 | 105 | 96 | 94 | 120 | 112 |
| Rear surface | O | Δ~X | X | Δ | O | O | X | X |
| Heat resistance (h) | | | | | | | | |
| Thermal discoloration resistance 400 | Grade 2 | 4 | 4 | 4 | 3 | 2 | 4 | 3-4 |
| Thermal deterioration resistance (Elongation %) 0 | 280 | 300 | 280 | 270 | 280 | 290 | 300 | 290 |
| 400 | 240 | 290 | 270 | 260 | 250 | 240 | 290 | 27 |
| 800 | 150 | 260 | 240 | 240 | 170 | 160 | 260 | 240 |
| 1200 | 60 | 210 | 180 | 190 | 100 | 70 | 200 | 190 |
| Low temperature resistance (cm) | >100 | >100 | 90 | 100 | 30 | 90 | >100 | 100 |

What we claim is:

1. In a polyvinyl chloride resin composition for powder molding comprising a dry blend of a polyvinyl chloride resin and a plasticizer, the improvement wherein said plasticizer is a mixed trimellitate plasticizer comprising a mixture of compounds represented by general formula I:

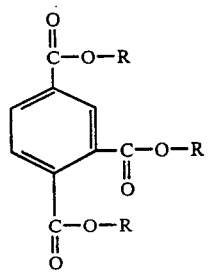

where R stands for an alkyl group, each of said compounds contains the same or different alkyl groups in one and the same molecule, or different molecules, and the alkyl groups in said mixture have a straight chain ratio of at least 85 mol % and consist of 5 to 55 mol % of alkyl groups having at most seven carbon atoms, 45 to 95 mol % of alkyl groups having eight carbon atoms, and at most 10 mol % of alkyl groups having nine and ten carbon atoms, and the content of alkyl groups having eleven or more carbon atoms being less than 1 mol %.

* * * * *